(12) United States Patent
Thøgersen et al.

(10) Patent No.: US 10,232,352 B2
(45) Date of Patent: Mar. 19, 2019

(54) CATALYZED CERAMIC CANDLE FILTER AND METHOD OF CLEANING PROCESS OFF- OR EXHAUST GASES

(71) Applicant: HALDOR TOPSØE A/S, Kgs. Lyngby (DK)

(72) Inventors: Joakim Reimer Thøgersen, Kgs. Lyngby (DK); Francesco Castellino, Birkerød (DK); Lars Storm Pedersen, Kgs. Lyngby (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/545,517

(22) PCT Filed: Apr. 28, 2015

(86) PCT No.: PCT/EP2015/059192
§ 371 (c)(1),
(2) Date: Jul. 21, 2017

(87) PCT Pub. No.: WO2016/150523
PCT Pub. Date: Sep. 29, 2016

(65) Prior Publication Data
US 2018/0008965 A1 Jan. 11, 2018

(30) Foreign Application Priority Data
Mar. 20, 2015 (WO) .................. PCT/EP2015/055951

(51) Int. Cl.
*B01J 23/44* (2006.01)
*B01D 53/86* (2006.01)
*B01D 53/94* (2006.01)
*B01J 23/02* (2006.01)
*B01J 35/00* (2006.01)
(Continued)

(52) U.S. Cl.
CPC ............ *B01J 23/44* (2013.01); *B01D 53/865* (2013.01); *B01D 53/8643* (2013.01); *B01D 53/8656* (2013.01); *B01D 53/944* (2013.01); *B01J 23/02* (2013.01); *B01J 23/22* (2013.01); *B01J 23/6482* (2013.01); *B01J 35/0006* (2013.01); *B01J 35/0066* (2013.01); *B01J 35/06* (2013.01); *B01J 37/0244* (2013.01); *F01N 3/035* (2013.01); *F01N 3/106* (2013.01); *F01N 3/2825* (2013.01); *F01N 13/009* (2014.06); *B01D 2255/1023* (2013.01); *B01D 2255/20707* (2013.01); *B01D 2255/20723* (2013.01); *B01D 2255/915* (2013.01); *B01D 2255/9155* (2013.01); *B01D 2257/404* (2013.01); *B01D 2257/502* (2013.01); *B01D 2257/702* (2013.01); *B01D 2257/708* (2013.01); *B01D 2258/01* (2013.01); *B01D 2258/0233* (2013.01); *B01J 21/14* (2013.01); *B01J 35/04* (2013.01); *B01J 37/0215* (2013.01); *B01J 2523/00* (2013.01); *F01N 2370/02* (2013.01)

(58) Field of Classification Search
CPC ........ B01J 23/6482; B01J 21/14; B01J 35/04; B01J 35/06; B01J 37/0215; B01J 2523/0031; B01J 37/0244; B01J 35/0066; B01J 35/0006; B01J 23/44; B01J 23/22; B01J 23/02; B01J 2523/22; B01J 2523/41; B01J 2523/47; B01J 2523/55; B01J 2523/824; B01D 53/944; B01D 2255/10233; B01D 2255/20707; B01D 2255/20723; B01D 2255/9155; B01D 2257/404; B01D 2257/502; B01D 2257/702; B01D 2257/708; B01D 2258/01; B01D 2258/0233; B01D 53/865; B01D 53/8643; B01D 46/2407; B01D 2255/915; F01N 3/2825; F01N 3/035; F01N 3/106; F01N 2370/02
See application file for complete search history.

(56) References Cited

U.S. PATENT DOCUMENTS 4,732,594 A * 3/1988 Mizrah .............. B01D 39/2093
501/81
5,248,481 A * 9/1993 Bloom ................... B01D 39/10
422/171

(Continued)

FOREIGN PATENT DOCUMENTS

EP    1 493 484 A1   1/2005
GB    2 514 177 A    11/2014
(Continued)

OTHER PUBLICATIONS

International Search Report (PCT/ISA/210) dated Nov. 6, 2015, by the European Patent Office as the International Searching Authority for International Application No. PCT/EP2015/059192.
(Continued)

*Primary Examiner* — Timothy C Vanoy
(74) *Attorney, Agent, or Firm* — Buchanan Ingersoll & Rooney P.C.

(57) ABSTRACT

Ceramic candle filter and use of the filter in the removal of particulate matter in form of soot, ash, metals and metal compounds, together with hydrocarbons and optionally nitrogen oxides being present in process off-gas or engine exhaust gas, wherein a noble metal comprising catalyst is arranged on the permeation side of the filter and/or on the dispersion side of the filter and/or within wall of the filter, said noble metal comprising catalyst contains a noble metal in an amount of between 20 and 1000 ppm/weight of the filter.

8 Claims, No Drawings

(51) Int. Cl.
*F01N 13/00* (2010.01)
*B01J 35/06* (2006.01)
*B01J 37/02* (2006.01)
*F01N 3/10* (2006.01)
*B01J 23/22* (2006.01)
*B01J 23/648* (2006.01)
*F01N 3/28* (2006.01)
*F01N 3/035* (2006.01)
*B01J 21/14* (2006.01)
*B01J 35/04* (2006.01)

(56) References Cited

U.S. PATENT DOCUMENTS

| | | | | |
|---|---|---|---|---|
| 6,843,821 | B2* | 1/2005 | Steigert | B01D 29/111 264/125 |
| 2007/0031304 | A1* | 2/2007 | Heidenreich | B01D 39/2068 422/177 |
| 2014/0373715 | A1* | 12/2014 | Alper | B01D 46/002 95/285 |
| 2017/0333819 | A1* | 11/2017 | Carius | B01D 39/2017 |

FOREIGN PATENT DOCUMENTS

| | | |
|---|---|---|
| WO | WO 90/13352 A1 | 11/1990 |
| WO | WO 98/03249 A1 | 1/1998 |
| WO | WO 2014/063738 A1 | 5/2014 |
| WO | WO 2016/150464 | 9/2016 |
| WO | WO 2016/150465 | 9/2016 |

OTHER PUBLICATIONS

Written Opinion (PCT/ISA/237) dated Nov. 6, 2015, by the European Patent Office as the International Searching Authority for International Application No. PCT/EP2015/059192.

International Search Report (PCT/ISA/210) dated May 4, 2015, by the European Patent Office as the International Searching Authority for International Application No. PCT/EP2015/055952.

Written Opinion (PCT/ISA/237) dated May 4, 2015, by the European Patent Office as the International Searching Authority for International Application No. PCT/EP2015/055952.

International Search Report (PCT/ISA/210) dated May 4, 2015, by the European Patent Office as the International Searching Authority for International Application No. PCT/EP2015/055951.

Written Opinion (PCT/ISA/237) dated May 4, 2015, by the European Patent Office as the International Searching Authority for International Application No. PCT/EP2015/055951.

* cited by examiner

CATALYZED CERAMIC CANDLE FILTER AND METHOD OF CLEANING PROCESS OFF- OR EXHAUST GASES

The present invention relates to ceramic candle filters and a method of for cleaning of process off- or exhaust gases. More particularly, the invention provides a catalyzed ceramic candle filter for the removal of dust and particulate matter in a process off-gas or an engine exhaust gas and harmful components contained in these gases. The catalyzed ceramic candle filter is in particular useful in the cleaning of process or raw gas from industrial processes involving combustion, like the production of minerals, glass, cement, waste incineration, or from coal fired boilers and engines.

Ceramic filters in form of filter candles are used in many industries for removal of particulate matter from process gases. They are one of the most efficient types of dust collectors available and can achieve collection efficiencies of more than 99% for particulates. The filters can be made from various ceramic materials comprising ceramic fibres.

The high particulate removal efficiency of ceramic candle filters is partly due to the dust cake formed on the surfaces of the candle filter and partly due to the candle filter composition and porosity. In order to provide sufficient filtration activity and an acceptable low pressure drop over the filter, conventional ceramic candle filters have a porosity of between 70 and 90%. The wall thickness of those filters should be in the range of 10-20 mm for sufficient stability and mechanical strength.

The particle-containing process gas very often contains a plurality of pollutants, e.g. $NO_x$, volatile organic compounds (VOC), $SO_2$, CO, $NH_3$, dioxins and furans, in concentrations that have to be reduced depending on local legislation. For this purpose, several conventional methods are available, including catalytic methods.

As an example, platinum is a known oxidation catalyst and frequently used in oxidative removal of VOC, $SO_2$, CO, $NH_3$, dioxins and furans.

The abatement of gaseous contaminants like $NO_x$, VOC, dioxins and furans can also be effectively carried out by contact with vanadium oxide-based catalysts commonly used catalysts for $NO_x$ reduction by selective reduction of $NO_x$ with $NH_3$ in stationary and automotive applications.

This catalyst is active both in the removal of hydrocarbons (VOC) and of NOx by combined oxidation and SCR reaction with NH3.

It is also known that vanadium oxide is an active oxidation catalyst. In comparison to the noble metal catalysts, like Pt and Pd catalysts, the vanadium oxide catalyst is less selective in the formation of $CO_2$ and some amounts of CO are produced during the oxidation reactions. CO cannot be oxidized to $CO_2$ at a feasible reaction rate by contact with vanadium oxide catalysts alone, but requires presence of much more expensive noble metal catalysts.

We have observed that a catalyst comprising very low amounts of a noble metal arranged within or on the wall of ceramic candle filters provides sufficient catalytic efficiency in the oxidation of hydrocarbons and carbon monoxide.

Pursuant to this observation, the present invention provides a ceramic candle filter, wherein a noble metal comprising catalyst is arranged on the permeation side of the filter and/or on the dispersion side of the filter and/or within wall of the filter, said noble metal comprising catalyst contains a noble metal in a total amount of between 20 and 1000 ppm/weight of the filter.

The terms "dispersion side" and "permeate side" as used herein refer to the flow side of the filter facing the unfiltered exhaust gas and to flow side facing the filtered off- or exhaust gas, respectively.

The invention provides additionally a method for the removal of particulate matter in form of soot, ash, metals and metal compounds, together with hydrocarbons and carbon monoxide being present in process off-gas or engine exhaust gas, comprising the steps of passing the off-gas or the exhaust gas through a ceramic candle filter and capturing the particulate matter;

reducing amounts of soot in the particulate matter captured on dispersion side of the filter and reducing amounts of hydrocarbons in the off- or exhaust gas by contact with an oxidation catalyst being arranged on and/or within wall of the filter, wherein said oxidation catalyst comprises one or more noble metals in a total amount of between 20 and 1000 ppm/weight of the filter.

In most applications amounts of lower than 500 ppm or even lower than 100 ppm/weight of the noble metal(s) in the oxidation catalyst are sufficient for the desired performance in the removal of hydrocarbons and carbon monoxide.

In another embodiment, the noble metal comprising catalyst further comprises a vanadium oxide and titania.

The term "a vanadium oxide" or "vanadium oxide" refers to:

Vanadium(II)oxide (vanadium monoxide), VO; or
vanadium(III)oxide (vanadium sesquioxide or trioxide), $V_2O_3$; or
vanadium(IV)oxide (vanadium dioxide), $VO_2$; or
vanadium(V)oxide (vanadium pentoxide), $V_2O_5$.

Preferably, vanadium oxide for use in the invention comprises or consists of vanadium(V)oxide (vanadium pentoxide), $V_2O_5$.

The term "titania" refers to titanium dioxide ($TiO_2$).

The catalytically active form of platinum or palladium is the metallic and/or oxidic form.

The shortage V/Ti, Pd/V/Ti and Pt/V/Ti shall mean a catalyst consisting of a vanadium oxide and titania and a catalyst consisting of palladium, a vanadium oxide and titania and a catalyst consisting of platinum, a vanadium oxide and titania, respectively.

These catalysts are preferred for the following reasons. The Pd/V/Ti catalyst has i) dual functionality (removal of NOx and removal of VOC, volatile organic compounds); ii) a S-tolerance; and iii) a lower $SO_2$ oxidation activity compared to other catalyst compositions.

As an example, when ammonia and VOC containing process gas is passed through the dispersion side of the filter loaded with a vanadium oxide-based catalyst, ammonia is removed by $NH_3$—SCR of NOx from the gas prior to its contact with the permeation side. Some amount of CO is formed after direct contact with the V/Ti catalyst during passage through the dispersion side by incomplete oxidation of VOC. By loading only the permeation side and/or the wall of the filter with a Pd catalyst or a Pd/V/Ti catalyst, CO and a remaining amount of VOC is then effectively oxidized to $CO_2$. In this way a minimum load of expensive palladium within the wall and/or on the permeation side of the filter can be achieved.

As a further advantage, when employing a Pd/V/Ti catalyst the catalyzed filter candles are sulfur resistant, i.e. not subjected to sulfur deactivation. The Pd/V/Ti catalyst additionally reduces the amount of $SO_3$ formed by oxidation of $SO_2$. If $H_2S$ is also present in the process gas entering the filter, it will also be oxidized to $SO_2$ on both the V/Ti and Pd/V/Ti catalyst.

In the case of high temperature ceramic filters several types of fibers may be used for their production. These can be constituted e.g. by silica-aluminate, calcium-magnesium-silicates, calcium-silicates fibers, or a mixture thereof.

Other preferred ceramic fibres comprise bio-soluble fibres selected from the group of calcium-magnesium-silicates.

The catalytically active material is applied on the ceramic filter by impregnating or coating the filter wall with a slurry containing the catalytically active material in form of titania micro-particles and the precursors of the active materials, e.g. salts of vanadium with a solution of a palladium and/or platinum salt or a slurry of titania micro-particles and salts of vanadium and palladium and/or platinum. Once impregnated, the filter is subsequently dried and heated up to the required temperature for the conversion of all precursors to the active catalyst composition.

EXAMPLE 1

The following example illustrates the performance obtainable with a ceramic candle filter prepared from calcium-magnesium-silicate fibres with a length of 3 m and wall thickness of 20 mm. The filter was coated within the wall with the V/Ti catalyst containing 1.26 wt % V and 2.36 wt % Ti calculated on the total weight of the filter. The porosity of the coated filter was 83%. The filter was tested in the oxidation of toluene in an inlet gas containing 40 ppm, dry toluene, 19% vol $O_2$, 8% vol $H_2O$.

Toluene oxidation on a V/Ti coated filter

| Temp. ° C. | Face vel. m/min | Conversion of Toluene % | CO, out ppm, wet |
|---|---|---|---|
| 220 | 1.28 | 96 | 16 |
| 240 | 1.34 | 98 | 35 |

As apparent from the table above, 85% of toluene was converted at 240° C. The CO emission at the same temperature was equal to 35 ppm, wet.

EXAMPLE 2

The following example illustrates the CO oxidation performance of the ceramic candle filter of Example 1, but additionally coated with 36 ppm Pd. The tests were conducted with a gas containing around 150 ppm, wet CO, 19% $O_2$ and 8% $H_2O$.

| Temp. ° C. | Face vel. m/min | CO, in ppm, wet | CO, out ppm, wet | Conversion of CO % |
|---|---|---|---|---|
| 220 | 1.28 | 148 | 36.5 | 75 |
| 240 | 1.35 | 157 | 4 | 97 |

At 240° C., 97% of the CO was oxidized to $CO_2$.

By combining the performance of the ceramic candle filter reported in EXAMPLE 1 and EXAMPLE 2, it is possible to conclude that only 1 ppm CO is emitted by a candle filter catalyzed with a V/Ti catalyst on the dispersion side and a Pd/V/Ti catalyst on the permeation side.

The invention claimed is:

1. A ceramic candle filter, wherein a noble metal comprising catalyst is arranged on the permeation side of the filter and/or on the dispersion side of the filter and/or within wall of the filter, said noble metal comprising catalyst contains a noble metal in a total amount of between 20 and 1000 ppm/weight of the filter, wherein the noble metal comprising catalyst further comprises a vanadium oxide and titania.

2. The ceramic candle filter of claim 1, wherein the noble metal is palladium and/or platinum.

3. The ceramic candle filter according to claim 1, wherein the ceramic material of the filter is selected from the group of silica-aluminate, calcium- magnesium-silicates, calcium-silicates fibers, or a mixture thereof.

4. The ceramic candle filter according to claim 3, wherein the ceramic material of the filter consists of bio-soluble fibres selected from the group of calcium-magnesium-silicates.

5. A method for the removal of particulate matter in form of soot, ash, metals and metal compounds, together with hydrocarbons and carbon monoxide being present in process off-gas or engine exhaust gas, comprising the steps of passing the off-gas or the exhaust gas through a ceramic candle filter and capturing the particulate matter;

reducing amounts of soot in the particulate matter captured on dispersion side of the filter and reducing amounts of hydrocarbons in the off- or exhaust gas by contact with an oxidation catalyst being arranged on and/or within wall of the filter, wherein said oxidation catalyst comprises one or more noble metals in total amount of between 20 and 1000ppm/weight of the filter, wherein oxidation catalyst further comprises a vanadium oxide and titania.

6. The method of claim 5, wherein the one or more noble metals of the oxidation catalyst are palladium and/or platinum.

7. The method according to claim 5, wherein the ceramic material of the filter is selected from silica-aluminate, calcium-magnesium-silicates, calcium-silicates fibers, or mixtures thereof.

8. The method according to claim 5, wherein the ceramic material of the filter comprises bio-soluble fibres selected from the group of calcium-magnesium-silicates.

* * * * *